May 8, 1956    A. BLAAUW ET AL    2,744,724
TRACTOR JACK
Filed Dec. 28, 1953
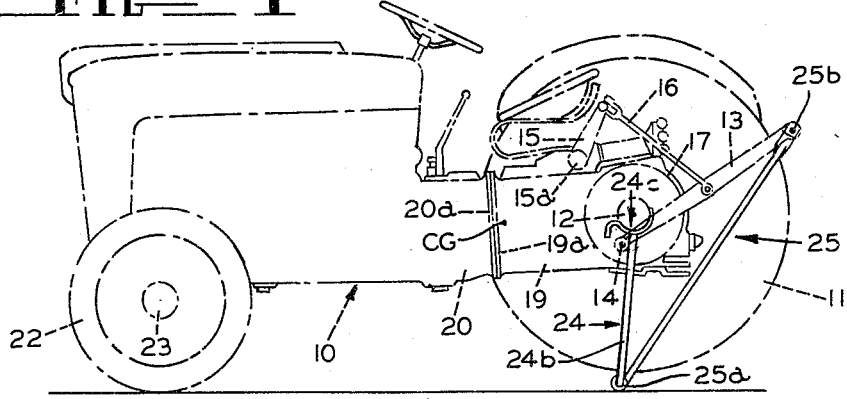
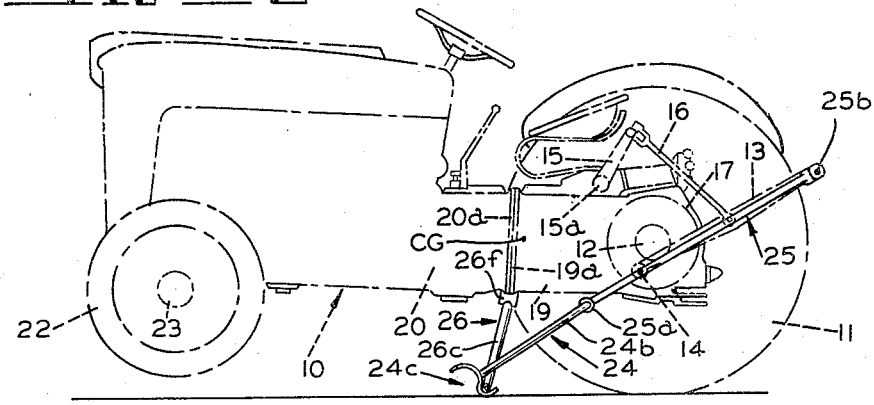
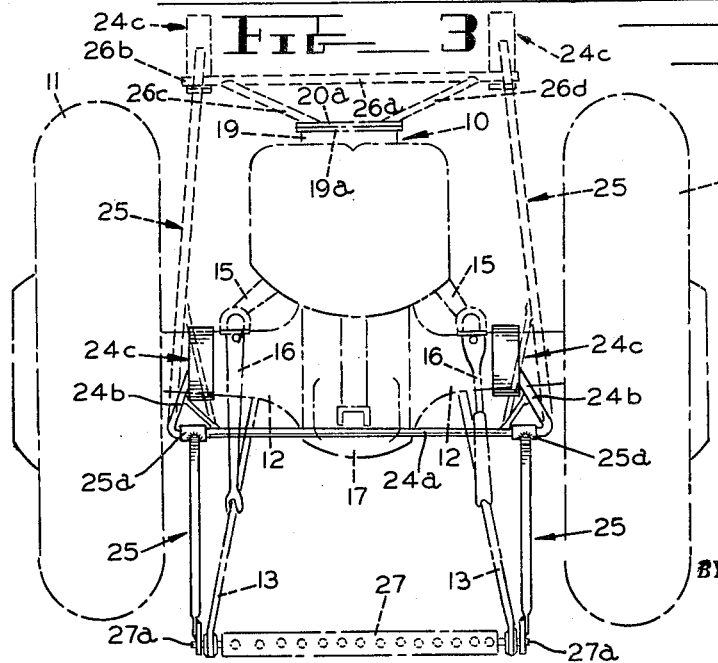
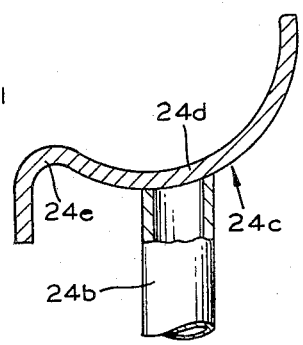
INVENTORS
A. BLAAUW
G. F. FINDLEY
ATTORNEYS United States Patent Office 2,744,724
Patented May 8, 1956

2,744,724
TRACTOR JACK

Andrew Blaauw and George W. Findley, Birmingham, Mich., assignors to Ford Motor Company, Dearborn, Mich., a corporation of Delaware Application December 28, 1953, Serial No. 400,495

2 Claims. (Cl. 254—94)

This invention relates to an improved tractor jack for use with agricultural type tractors having laterally spaced, power lifted, trailing hitch links.

Jack constructions have heretofore been provided for this type of tractor which utilize the power lifted movements of the hitch links to effect the elevation of either the tractor rear wheels or the front wheels. The most common approach in the prior constructions has been to utilize a rear jack stand proportioned to fit beneath the tractor rear axle housing and effect the elevation of the tractor rear wheels by rocking of the tractor forwardly onto such stand by the power lifted movements of the tractor hitch link. With such rear stand construction, it was necessary to provide a separate stand engaging the underside of the tractor body at a point substantially forwardly displaced from the tractor rear axle housing in order to effect the elevation of the tractor front wheels. Since in most agricultural applications, the elevation of the tractor is performed to effect changing of wheel spacing, it is equally essential that the front wheels of the tractor be capable of convenient elevation as it is for the rear wheels.

The devices heretofore proposed have utilized chains, links, or similar type of tension transmitting connectors for effecting a connection between the front jack stand and the rear jack stand. This necessarily resulted in the jack being made up of a substantial number of components which could be readily misplaced or lost between the widely separated times that the average farmer has use for such jack.

Accordingly, it is an object of this invention to provide an improved jack construction for use with tractors of the type having a pair of laterally spaced, power lifted trailing hitch links characterized by the fact that the entire jack construction embodies only two separate pieces and hence is susceptible to convenient economical manufacture.

A further object of this invention is to provide an improved tractor jack construction which will permit the selective elevation of the tractor rear wheels or the tractor front wheels and, in effecting the elevation of the tractor front wheels, the rear wheel jack stand is utilized as the force transmitting element between the front wheel jack stand and the power lifted hitch links.

The specific nature of this invention, as well as other objects and advantages thereof, will become apparent to those skilled in the art from the following detailed description taken in conjunction with the attached drawings on which, by way of preferred example only, is illustrated one embodiment of this invention.

On the drawings:

Figure 1 is a side elevational view of a well known type of agricultural tractor, with one rear wheel removed for clarity, showing a jack embodying this invention assembled thereto and operated to elevate the rear wheels of the tractor.

Figure 2 is a view similar to Figure 1 but showing the position of the jack elements relative to the tractor when utilized to elevate the front wheels of the tractor.

Figure 3 is a plan view of the rear portions of the tractor shown in Figure 1, with the dotted lines illustrating the position of the jack elements utilized in Figure 2.

Figure 4 is an enlarged scale, partially in section, elevational view of the bracket formed on the rear jack stand for engagement with the tractor rear axle housing.

As shown on the drawings:

In Figures 1 thru 3, there is shown a tractor 10 of well known make having a pair of rear wheels 11, such wheels being respectively rotatably mounted on the ends of a rear axle housing 12. A pair of laterally spaced hitch links 13 are pivotally connected at laterally spaced points 14 to the tractor rear axle housing 12. A pair of rock arms 15 are respectively secured to the ends of a transverse rock shaft 15a journalled in the upper portion of the differential housing 17 of tractor 10. Rock shaft 15a is rotated by a built-in hydraulic mechanism (not shown). Links 16 connect rock arms 15 with hitch links 13. The differential housing 17 terminates forwardly in a center housing 19 which is of a unitary cast construction with a forwardly facing end flange 19a which is connected to the rearwardly facing flange 20a of the tractor transmission housing 20 by a plurality of bolts (not shown). As is customary, due to the relatively greater mass of the tractor rear wheels, the center of gravity of the tractor CG is located in the vicinity of the joined flanges 19a and 20a and, of course, is disposed approximately on the horizontal center line of the tractor body. The front end of tractor 10 is supported by a pair of wheels 22 journalled in conventional fashion on the ends of a front axle 23. All of the above described elements of the tractor 10 are well known and hence further description thereof is not believed necessary.

The improved tractor jack constructed in accordance with this invention comprises a rear stand 24, a separable front stand 26, and a pair of force transmitting links 25 which are permanently joined to the rear stand 24.

Rear stand 24 comprises a generally U-shaped member, which may be conveniently fabricated of tubing, having a ground engaging bight portion 24a and a pair of laterally spaced arm portions 24b. At the top end of each arm portion 24b a bracket 24c is provided which has an upwardly or outwardly facing concave portion 24d suitably shaped to engage the underside of tractor rear axle housing 12 at a point between the differential housing 17 and the adjacent rear wheel 11. Additionally, bracket 24c is provided with a convex hook shaped portion 24e for a purpose that will hereafter be described.

The force transmitting links 25 terminate in sleeve like portions 25a which are respectively journalled at the lateral extremities of the bight portion 24a of the rear stand 24. The free ends of links 25 are provided with suitable apertures 25b which receive the pin like ends 27a of the conventional tractor drawbar 27 which is conventionally connected in the apertured ends 13a of the tractor hitch links 13.

When the rear stand 24 is positioned beneath the tractor, as in the position illustrated in Figure 1, with the bight portion 24a lying on the ground, the axle bracket portions 24c will respectively engage laterally spaced portions of the tractor rear axle housing 12 and the overall height of the stand arms 24b is greater than the ground clearance of such portions of the tractor rear axle housing 12. Accordingly, when the tractor hitch links 13 are elevated by conventional operation of the tractor hydraulic mechanism, the result will be the upward pivoting of the rear portions of the tractor about rear stand 24, and hence the elevation of the tractor rear wheels 11 as shown in Figure 1.

The front jack stand 26 is of generally triangular configuration and may be conveniently fabricated by welding together of tubular sections. The bottom member 26a of front stand 26 has end portions 26b respectively projecting beyond the extremities of the two upstanding side elements 26c and 26d. At the top juncture of side elements 26c and 26d a bracket 26f is provided which is suitably shaped so as to engage the joined bolt flanges 19a and 20a of the tractor body. The overall height of front stand 26 is, of course, proportioned so as to be in excess of the ground clearance of the bottom portions of the joined bolt flanges 19a and 20a.

To utilize the front stand 26 to elevate the tractor front wheels, the jack elements are positioned as shown in Figure 2. The connection of the force transmitting links 25 to the tractor power lifted hitch links 13 is effected in the same manner as has already been described. However, instead of the brackets 24c of the rear stand 24 being engaged with the tractor rear axle housing, such stand is swung downwardly and forwardly so as to, in effect, constitute an extension of the force transmitting links 25. The hook shaped portions 24e of the brackets 24c are engaged with the projecting ends 26b of the front stand 26 and thus the force produced by the lifting movements of the hitch links 13 are transmitted to the base of front jack stand 26. This results in a rocking of the tractor upwardly and rearwardly with respect to the front jack stand 26, as illustrated in Figure 2, and the resulting elevation of the tractor front wheels 22. The front wheels are elevated in this instance because of the positioning of the point of ground engagement of the front jack stand 26 at a position slightly forwardly of the center of gravity of the tractor 10.

From the foregoing description, it will be apparent that this invention provides a simple and economically manufacturable jack construction which invloves only two separate pieces and which can be utilized to selectively effect the elevation of the tractor rear wheels or the tractor front wheels in response to the power lifted movements of the tractor hitch links.

It will, of course, be understood that various details of construction may be varied through a wide range without departing from the principles of this invention and it is, therefore, not the purpose to limit the patent granted hereon otherwise than necessitated by the scope of the appended claims.

We claim:

1. For use with a wheel tractor having a central body, a transverse rear axle housing having laterally spaced portions thereof, and a pair of laterally spaced, power lifted trailing hitch links pivoted to said rear axle housing; a jack comprising a U-shaped stand having arm portions joined by a bight portion, a bracket having an outwardly facing concave portion and a convex hook shaped portion and fixedly secured underside the concave portion on the ends of each arm portion, the length of said arm portions being substantially greater than the ground clearance of said laterally spaced portions of said rear axle housing, a pair of tension links pivotally connected in laterally spaced relation to said bight portion, said links being connectable respectively with said power lifted tractor hitch links, a separable stand having a ground engaging member and an upstanding frame rigid therewith having means on the top thereof for engaging said tractor body at a point forwardly of the center of gravity of the tractor, said stand having an over-all height in excess of the ground clearance of said tractor body, said hooked shaped elements being respectively engageable with laterally spaced portions of said ground engaging member of said separable stand, whereby said stands connect to said hitch links and thereby produce elevation of the tractor front wheels in response to raising movements of said tractor hitch links.

2. The structure defined by claim 1 which is further characterized in that said separable stand comprises a triangular configuration of tubular members fixedly secured to one another, the ground engaging element thereof having end portions respectively projecting laterally beyond the upstanding elements for respective engagement with said hook shaped portions with said brackets.

References Cited in the file of this patent
UNITED STATES PATENTS 2,555,471     Chambers _____ June 5, 1951
2,667,329     Blaauw et al. _____ Jan. 26, 1954